J. PENIOZAK.
NUT LOCK.
APPLICATION FILED APR. 19, 1917.
1,253,523.
Patented Jan. 15, 1918.
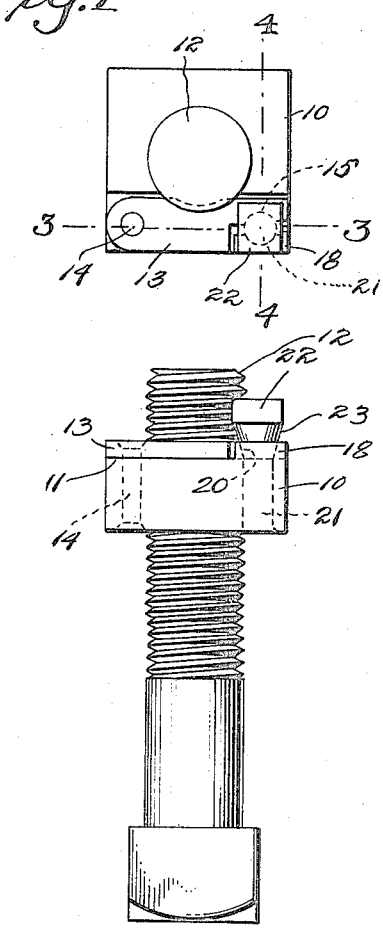
Fig. 1
Fig. 2
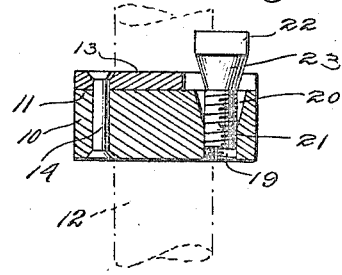
Fig. 3
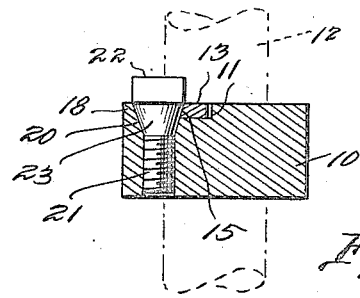
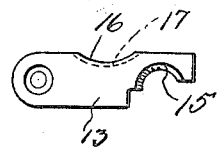
Fig. 4
Fig. 5
Inventor
J. Peniozak
By R. Morgan Elliott & Co.
Attorney
Witnesses

UNITED STATES PATENT OFFICE.

JOHN PENIOZAK, OF PE ELL, WASHINGTON.

NUT-LOCK.

1,253,523.  Specification of Letters Patent.  Patented Jan. 15, 1918.

Application filed April 19, 1917. Serial No. 163,166.

*To all whom it may concern:*

Be it known that I, JOHN PENIOZAK, a subject of the Emperor of Austria, residing at Pe Ell, in the county of Lewis and State of Washington, have invented certain new and useful Improvements in Nut-Locks, of which the following is a specification.

This invention relates to nut locks and has special reference to a nut lock embodying a single nut and means to clamp the nut against rotation on the bolt.

One important object of the invention is to improve the general construction of devices of this character.

A second important object of the invention is to provide a device of this character wherein the clamping means employed will not cause bruising or distortion of the threads of the bolt.

A third important object of the invention is to provide an improved form of nut lock wherein the pressure of the clamping means may be adjusted to suit varying conditions, it being obvious that where the vibration is not great a light pressure will serve to retain the nut while where the vibration is of considerable force a higher pressure will serve to retain the nut.

With the above and other objects in view, as will be hereinafter apparent the invention consists in general of certain novel details of construction and combinations of parts hereinafter fully described, illustrated in the accompanying drawing and specifically claimed.

In the accompanying drawing, like characters of reference indicate like parts in the several views, and:—

Figure 1 is an end view of a bolt showing the improved nut applied thereto.

Fig. 2 is a side view thereof.

Fig. 3 is a section on the line 3—3 of Fig. 1.

Fig. 4 is a section on the line 5—5 of Fig. 1.

Fig. 5 is a detail view of the clamping plate used herewith removed from the nut.

In carrying out the objects of this invention there is provided a nut 10 which is preferably of the usual square form and along one side of this nut extends a recess 11 one edge of which intersects the opening or hole which receives the bolt 12, this opening being commonly called "the bolt hole." This recess 11 has located therein a clamping plate 13 one end of which is pivoted to the end by a pivot 14 while the other end of this clamping plate is reduced in width and provided with a beveled arcuate notch 15 on the side away from the bolt hole. This plate is so positioned as to be capable of being forced inward to engage the bolt 12 and in order to effect the clamping operation without bruising the threads of the bolt 12 the plate is provided on the side next the bolt with an arcuate notch 16 having threads 17 cut therein corresponding to the threads on the bolt. At the end of the recess 11 away from the pivot pin 14 there is provided a lug 18 and opposite this lug is a screw threaded opening 19 having an enlarged upper end 20. Inserted in the opening 19 is a threaded shank 21 of a screw which is provided with a head 22 suitable for engagement by a turning tool such as a wrench or the like. Immediately below this head the screw is formed in inverted frusto-conical shape as indicated at 23 so that this portion of the screw constitutes a rotatable washer which engages on one side against the lug 18 and on the other side against the plate 13 in the notch 15. By means of this construction as the screw is screwed downward the wedge portion forces the free end of the plate 13 inward and thus clamps the plate against the bolt 12 and it will be obvious that the extent of downward movement of the screw regulates the force with which the plate 13 is moved inward. Moreover it will be plainly seen from Figs. 3 and 4 that the purpose of the enlarged opening 20 is to permit the screw to move downward freely.

In the operation the screw 21 is loosened and the nut applied to the bolt in the ordinary manner. After the nut has been screwed into the proper position the screw 21 is then screwed down until the plate 13 is forced to the proper extent against the plate 12 thus locking the nut from accidental rotation.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new is:—

1. A device of the kind described comprising a nut having a recess at one side of its top face and intersecting the bolt hole of said nut, a clamp plate having one end pivoted to the nut in said recess and arranged to swing against a bolt passing through the bolt hole of the nut, said nut being provided with a screw threaded opening adjacent the free end of the clamp plate, and a screw threaded into said opening and provided with a head for engagement by a turning tool, said screw having beneath said head an inverted frusto-conical portion constituting a rotary wedge and bearing against the outer side of the clamp plate to force the latter toward the bolt hole as the screw is screwed down.

2. A device of the kind described comprising a nut having a recess at one side of its top face and intersecting the bolt hole of said nut, a clamp plate having one end pivoted to the nut in said recess and arranged to swing against a bolt passing through the bolt hole of the nut, said nut being provided with a screw threaded opening adjacent the free end of the clamp plate, a screw threaded into said opening and provided with a head for engagement by a turning tool, said screw having beneath said head an inverted frusto-conical portion constituting a rotary wedge and bearing against the outer side of the clamp plate to force the latter toward the bolt hole as the screw is screwed down, said plate having a segmental notch into which said wedge fits and being further provided with a screw threaded notch for engagement with the bolt extending through the bolt hole.

In testimony whereof I affix my signature.

JOHN PENIOZAK.

Witnesses:
STEPHEN J. KOTULA,
JOE. GRZYBOSKI.

Copies of this patent may be obtained for five cents each, by addressing the "Commissioner of Patents, Washington, D. C."